10

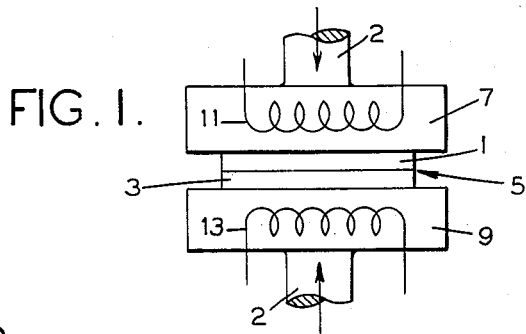
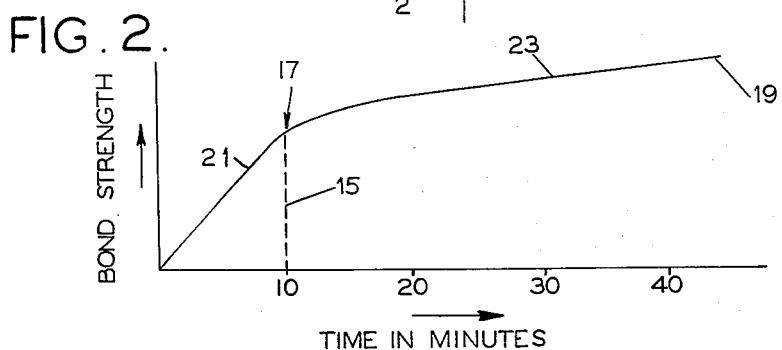
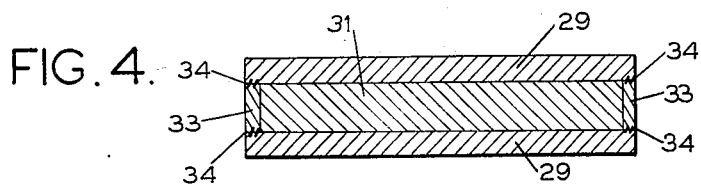
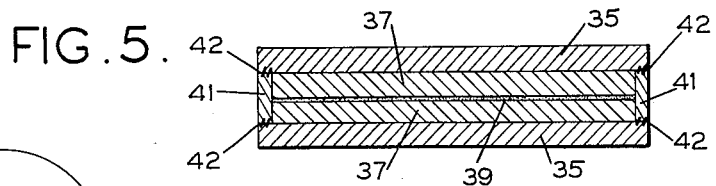
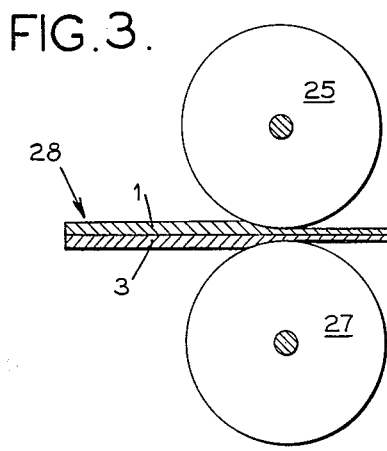

United States Patent Office 2,834,102
Patented May 13, 1958

2,834,102
SOLID-PHASE BONDING OF METALS

Heinz R. Pflumm, North Attleboro, and Freeman P. Rogers, Plainville, Mass., assignors to Metals & Controls Corporation, Attleboro, Mass., a corporation of Massachusetts Application September 28, 1956, Serial No. 612,635

18 Claims. (Cl. 29—497)

This invention relates to the solid-phase bonding of malleable metals, i. e., the joining of the same or different solid malleable metals without adding or otherwise producing a liquid-phase material between them. The term metals as used herein includes alloys.

Among the several objects of the invention may be noted the provision of a convenient solid-phase bonding method which is applicable to the bonding of all malleable metals of like or differing yield points and work-hardening properties; the provision of a method of the class described providing for accurate control of variables such as pressures, heating times and temperatures, whereby the quality of the composite products may be closely controlled; the provision of a method of the class described having a lower reduction requirement which makes the method applicable without difficulty to metals of both high and low degrees of malleability, thus providing for more accurate dimensional control of the products with reduction of scrap rate caused by stretch-off, edge cracking and the like; the provision of a method of the class described which minimizes the need for expensive cleaning operations, or protective ambient atmospheres and vacuums; and the provision of a method of this class which is economically adaptable to both large volume and smaller batch production, as required. Other objects and features will be in part apparent and in part pointed out hereinafter.

The invention accordingly comprises the steps and sequence of steps, and features of manipulation, which will be exemplified in the methods hereinafter described, and the scope of the application of which will be indicated in the following claims.

In the accompanying drawings, in which several of various possible embodiments of the invention are illustrated, Fig. 1 is a diagrammatic view exemplifying a hot-squeezing operation;

Fig. 2 is a chart of characteristic bonding strength-time values obtained during the hot-squeezing operation illustrated in Fig. 1;

Fig. 3 is a diagrammatic view illustrating a squeezing reduction operation;

Fig. 4 is a diagrammatic cross section illustrating packaging means useful for producing double-clad composite metal; and, Fig. 5 is a view similar to Fig. 4, illustrating packaging means useful for producing single-clad composite metal.

Corresponding reference characters indicate corresponding parts throughout the several views of the drawings.

Briefly, the present invention is a process comprising three broad, basic steps as follows:

(1) Partial diffusion bonding between pressure-contacted malleable metal surfaces, the contacting face of at least one of said metals having theretofore been work hardened, the temperature being at or above the recrystallization temperature of said one metal and the heating being done while the contacting faces are in engagement.

(2) Energization of the partially bonded interface by pressure reduction which also results in an increase in interfacial area; and (3) Final heating of at least the interface to increase the bond strength.

The partial bonding of step 1 occurs between contacting surfaces:

(a) Which have been conventionally cleaned;

(b) At least one surface of which has been placed in a higher energy state produced by mechanical working;

(c) Which are pressed together with a force bringing about a multitude of discrete contact points; and (d) Which are heated while in contact under said force to a temperature lying within the range which extends from and includes the recrystallization temperature of at least one of the metals which has been work hardened up to but not including the temperature at which a liquid-phase or brittle intermetallic compound would appear in the bonding area, whereby it is believed rapid diffusion just below, at or above the recrystallization temperature is brought about. If more than one metal has been work hardened, the temperature referred to above preferably is in respect to the metal having the highest recrystallization temperature.

The required components are provided by individual sheets, blocks, bars, strips, tubes, rods or the like of the metals to be bonded. These components may be of any appropriate forms to produce desired dimensions of one or more of the respective materials in the ultimate composite or combination. Thus, individual sheets, blocks, bars or strips may be combined with others of the same characteristic shapes; rods may be combined with tubes; and other similar combinations may be made. The resulting combinations will hereinafter be referred to as composites, regardless of their shapes. Their components may be constituted by the same or different metals.

It is assumed that (1) the material in at least one of the faces to come into interfacial contact is to be, or has been first, mechanically worked so that it is in a higher energy state, thermodynamically considered, the grain structure being distorted sufficiently that under proper temperature conditions rapid diffusion as specified above will take place; (2) both faces are to be, or have been, cleaned throughout the interfacial contact area to be established between the layers, so as to remove any bond-deterrent contaminants that may exist thereon; and (3) the contact surfaces are generally like-shaped so as to be substantially coextensive upon being pressed together. For example, both of them may be substantially flat, cylindric, or the like (as the case may be) so that intimate contact may be initially established at many discrete points throughout the interfacial area when the surfaces to be bonded are forced together.

If the separate components, considered as raw material for the process, are not in the condition above set forth, such steps are to be taken to place them in such condition as are well known in the art. For example, working may be accomplished by cold rolling, swaging or drawing, etc. Hot working may be employed in those cases in which cold working is not feasible as, for example, in the case of a brazing alloy with a high phosphorous content constituting one element of a composite. Or, a machining operation of a contacting surface may be employed for work hardening as, for example, milling, broaching or the like. Whatever operation is employed for working should minimize the deposition of those contaminants that cannot be readily removed by conventional cleaning operations and should not heat the surfaces to such a high degree as to interfere with the work hardening desired.

If a surface during or after work hardening as above described becomes contaminated, the contaminants may be removed by conventional means, such as brushing, wiping, chemical cleaning, etching, pickling or the like, to remove grease, dirt, grit and similar particles and bond deterrents. It is not necessary that the cleaning shall be as meticulous as that referred to in Boessenkool et al. Patent 2,691,815, because the present process does not require the preliminary removal by cleaning of the barrier films referred to in that patent, i. e., those which approach molecular dimensions in thickness, such as hydrated or other natural oxide and compound films, chemisorbed layers and adsorbed layers of liquids and gases. The employment of a hot-pressing step according to the present invention avoids the necessity for such a meticulous cleaning and constitutes one of the advantages of the present invention.

By work hardening a metal is meant herein the deformation of the metal crystals by mechanical means below the recrystallization temperature of the metal. This places the deformed crystals in a higher energy state (thermodynamically), which energy is subsequently released. In this connection it will be understood that, although both of the layer faces to be interfacially contacted may be work hardened, the process may be carried out with only one of said faces so work hardened, the other being of soft temper, i. e., not work hardened. This may be necessary in the event that one component has a recrystallization temperature above the melting point of the other component.

Thus a first interfacial contact to be described is to be between two conventionally cleaned metal surfaces, the metal of at least one of the surfaces at the interface to be in a state of higher energy by reason of work hardening.

Assuming that one or both of the surfaces of the metals to be bonded have been work hardened and cleaned as above described, a hot-pressing step is performed such as illustrated in Fig. 1. This figure shows component layers 1 and 3 which respectively represent either different malleable metals or the same malleable metal placed with clean surfaces in interfacial contact at 5, the contact surface of at least one of which layers having been work hardened. The layers 1 and 3 are then placed between the heated platens 7 and 9 of a suitable press, as shown. Heating of the platens may be accomplished by any one of the known means, such as by a surrounding conventional type of protective-atmosphere furnace (not shown), or by conventional heating wires 11 and 13 (without a protective atmosphere), the latter being shown by way of example. The protective atmosphere is sometimes desirable for ancillary reasons, such as to preserve exterior finish, or in connection with certain metals which oxidize readily, such as beryllium copper, for example. In general, the protective atmosphere is not necessary insofar as the contacting faces of 1 and 3 are concerned.

The platens 7 and 9, as shown by the arrows, are forced together by a hydraulic, mechanical or like means 2, adapted to produce pressure at the interface 5. The force employed needs to be sufficient only to engender intimate contact at many discrete physical contact spots throughout the interface 5, which contact is the sole purpose of the application of force during this contacting and heating step. The exact pressure employed depends on the materials being pressed, the more deformable materials requiring less force. A press exerting a force up to 40 tons has been found to be practical for hundreds of different metal combinations ranging from a few square inches in contact area to several hundred square inches.

The temperature employed at the interface 5 during the hot-pressing step illustrated in Fig. 1 is in the range from the recrystallization temperature of at least one of the metals which has been work hardened and preferably (if both metals have been work hardened) from the recrystallization temperature of the metal having the highest recrystallization temperature, up to but not including the temperature at which a liquid phase would appear at the interface 5 or at which brittle intermetallic products would form. The temperature employed has its purpose rapid diffusion across the interface during or near recrystallization, accompanied it is believed by release of at least some of the energy above referred to.

In any event, the result of the pressing and heating is the creation of a substantial bond at each of the multitude of contacts. However, since the contacts, multitudinous as they are, do not entirely cover the interfacial area, a partial or incipient bond only occurs between the metals, in the sense that the integrated interfacial bond is not as strong as if the metals were, for example, continuously welded by a liquid phase throughout the interfacial area. Thus the incipient bond generated in this step is relatively weak, but sufficient to hold the layers 1 and 3 together for manipulation according to subsequent steps carried out after release from the press platens 7 and 9.

The time required for effecting the incipient bond desired to be accomplished by the Fig. 1 step is shown, for example, in Fig. 2, which by curve 19 plots bond strength against time for the Fig. 1 simultaneous pressing and heating operation. It is to be understood that the layers when inserted into the press will usually not be as hot as the press and that in the press their temperature rises to the desired value. As appears in the example illustrated by Fig. 2, the bond strength increases rapidly over the first ten minutes and much less rapidly thereafter (note the critical line 15 at ten minutes of bonding time). Thus at the time represented by line 15 the temperature of the interface between layers has risen to a value such that most of the recrystallization has taken place. The critical time is indicated on the curve by the knee 17 separating a section 21 having a steep slope from a section 23 having less slope.

A characteristic curve such as shown in Fig. 2 may be drawn for each combination of metals to be bonded, the shapes of which will be generally similar. However, the exact values in the various cases that may be encountered may differ somewhat from those shown. In other words, line 15 under knee 17 may correspond to different times on different curves for different metal pairs and dimensions. Thus the curve of Fig. 2 also illustrates the point that the heating during the pressing step illustrated in Fig. 1 should be at a temperature high enough that the partial bond strength is obtained by rapid diffusion during or near recrystallization in the first few minutes of pressing. After that it is usually not desirable to consume time in obtaining only smaller increments of bond strength per unit of time. If the temperature is too low, then the curve of bond strength vs. time is lower than that shown in Fig. 2 and consists of a straighter line of more constant slope, implying that advantage is then not being taken of maximum rapid increase in bond strength such as afforded by employment of higher temperatures. A range of temperatures within substantially 400° F. to 1,850° F. inclusive will cover the temperatures required in this step in most cases in order to bring about rapid diffusion in a short time.

Similar though not identical results to those shown in Fig. 2 may be obtained readily by tests carried out for various combinations of malleable metals, and Fig. 2 may be taken as a typical curve showing the relationship between incipient bond strength and time, at a sufficient temperature that the desired partial bonding will take place within a practical time. As a rule, heating is stopped at a time corresponding to the end of the rapid increase in incipient bond strength (Fig. 2), as shown at 17.

After the hot-pressing operation, it is usually desirable, although not always necessary, to permit the layers 1 and 3, as partially bonded by the hot-pressing operation, to cool. This may be done in many cases by taking the composite ingot out of the hot press and allowing it to cool to room temperature. In such cases, strains will be set up because of cooling stresses, but this is satisfactory, provided the particular metals are not such that these stresses will reopen the partial bond. In some cases it may be found desirable to cool under pressure in order to resist strain so as better to preserve the initial bond. Thus the composite may be left in the hot press to cool by allowing the press to cool with it; or it may be quickly transferred to a cold press for the purpose. The latter (if pressure is desired to be maintained during cooling) is preferable from the standpoint of the savings effected in cooling time. The pressure employed may be of the order of that employed in the hot press.

It should also be understood that in some cases complete cooling may be omitted, but in all cases, cooling must be such that one of the components will work harden in the subsequent reduction or squeezing step now to be described. For reasons of workability in said reduction step, it may be desirable to keep the metals at an elevated temperature, such as in the case of the aforementioned brazing material having a high phosphorous content.

The next step in the process is to deform the incipiently bonded assembly 1, 3 by a squeezing reduction at a temperature below the recrystallization temperature of that component thereof having the highest recrystallization temperature. This is to enlarge the interface 5, which with concurrent grain deformation will cause re-energization of the interface. This step also obtains more points of metal contact between the faces of layers 1 and 3 without destroying too many of the incipient bonds theretofore obtained in hot-pressing step of Fig. 1, and in fact, it is believed, improving at least some of the latter.

There are various methods for accomplishing the desired deformation by reduction. A preferred one for sheets or sheet-like materials is by rolling in a single pass at least in part at a temperature below the stated recrystallization temperature, with concomitant reduction in the as-bonded thickness of the incipiently bonded composite 1, 3 (see Fig. 3). Mill rolls for the purpose are shown at 25 and 27, operating to produce a composite sheet or strip. The reduction required for the purpose is comparatively low, an appropriate range covering most metals being substantially 10–35%. A single-pass reduction is preferable for metals of similar work-hardening characteristics, because it quickly accomplishes the desired work hardening (reenergization) at the interface 5, and produces additional points of contact without excessive destruction of the incipient bonds theretofore obtained in the Fig. 1 step. However, in cases of metals of widely different work-hardening characteristics, several light reduction passes are preferably employed to obtain the total reduction desired within the stated range. This minimizes the danger of destroying the previously formed incipient bond. As an example of the latter kind may be mentioned fine silver bonded to beryllium copper.

The physical nature of the engagements established at the additional points of contact obtained during the squeezing operation such as shown in Fig. 3 is believed to be similar to that described in said Boessenkool et al. Patent 2,691,815, to which reference may be made for further particulars in this regard. However, the meticulous cleaning steps referred to in said Boessenkool et al. patent are not necessary to the present process. In the case of the present invention, the effect of any original unremoved thin barrier films which approached molecular dimensions in thickness has been reduced by the heating during the pressing step illustrated in Fig. 1. Such films are believed to diffuse into the bodies of the components, or be carried away laterally from the interface.

It will be noted that, in general, the squeezing pressure for reduction is smaller according to the present invention than according to said Boessenkool et al. patent. Nevertheless, the character of the contact effected by the reduction step of Fig. 3 is believed to be like that of the patent, in that atoms of the two metals are pushed together sufficiently, it is believed, to be within the range of their interatomic attractive forces. Thus both the order of events employed in the present process and their nature account for the smaller reductions required, for the present invention applies the reducing squeeze to an already partially bonded surface and serves to increase the partial bond but without completing the bond.

After the composite partially bonded layers 1, 3 issue from the rolls 25 and 27, they are subjected to a final heating operation at a temperature in the range extending from the recrystallization temperature of the component that has the lowest recrystallization temperature to just below that temperature at which a liquid phase or brittle intermetallic compound can form in any appreciable amount, whichever is the lower. This, it is believed, causes additional rapid diffusion during or near recrystallization at the interface, accompanied by lateral spreading growth of bonds from and around the contact points theretofore established, so as more completely to bond throughout the interface 5. The theory of the lateral bond growth mentioned is set forth in said patent. The time and temperature are controlled so that the bond between the layers 1, 3 grows from a partially bonded condition to a greater or, if desired, a substantially complete bond, sufficient to hold the layers together under the manufacturing operations to be applied to them thereafter, such as forming, drawing, bending and the like. A range of from 2 to 45 minutes is generally sufficient at such temperatures.

At this point will be mentioned the effect of two phenomena known in the art as alligatoring, and stretch-off. Alligatoring is the tendency of any layers issuing from pressure rolls such as shown in Fig. 3 to separate. Stretch-off is an unequal increase in the lengths of the components during said step. Both of these phenomena tend to open the previously formed incipient bond. Whether or not there will be sufficient alligatoring and/or stretch-off to effect opening of the previously-obtained bonds depends on various factors, such as, for example, the work-hardening tendencies of the components both relative and absolute, layer thicknesses, residual stresses, and the like. In general, it can be said that the greater the tendency to alligator, the greater should be the reduction; and the greater the tendency to stretch-off, the less should be the reduction. In the Fig. 3 illustration it is assumed that the alligatoring tendency has been insufficient to separate the incipient bond which was formed in the hot pressing of Fig. 1.

If alligatoring tends to occur it may be avoided by one of several means. One means is by welding or riveting the leading edge of the partially bonded composite material 1, 3 before entry into the rolls 25, 27. The trailing edge may also be welded or riveted. Such welding or riveting, if required, is performed at points 26 and 28, respectively, before entry into the reduction step.

In adidtion to resisting alligatoring, the welding or riveting reduces stretch-off which tends to occur with some combinations of materials wherein one of the components is relatively soft.

Referring to Fig. 4, there is illustrated the provision of metal layers 29, composed of the same materials, which sandwich another layer 31 composed of a different material, the object being to manufacture a double-clad composite and at the same time to exclude the ambient atmosphere from the interface and minimize alligatoring. The margins of the layers 29 extend beyond the layer 31 sufficiently to allow emplacement of filler strips 33, which preferably completely surround the layer 31. The margins of the strips 33 are welded to the margins of the layers 29, as indicated at 34. At this stage, it is assumed that the contact faces have been properly cleaned and at least one of them work hardened prior to assembling as described. The resulting assembly or package is then ready for passing through the steps of the process above described, starting with the Fig. 1 step. During the process the filler strips 33 function both to resist alligatoring and, in the case of certain metals such as copper on titanium, to prevent absorption by the titanium of deleterious products from any ambient atmosphere. While such absorption might not damage the bond, it may damage the bulk of the titanium as such.

In Fig. 5 is shown another form of protective means in case it is desired to produce single-clad composites. In this case the metals of layers 35 are the same. The metals of layers 37 may be the same as each other or different, but in any case different from the metals of layers 35, respectively. The layers 37 are separated by a layer of parting compound 39, such as graphite and lampblack, which will prevent bonding. The margins of layers 35 extend beyond the margins of layers 37. Marginal strips 41 are welded as at 42 around the margins of layers 35.

After the reduction step shown in Fig. 3 and final heating, the marginal material, including the then compressed strips 33 or 41, as the case may be, is trimmed off. In the case of the Fig. 4 assembly, the final product consists of a bonded composite double-clad material; and in the case of Fig. 5, two composites of bonded single-clad material are produced. It will be understood that other conventional packages or wrappers may be employed for preventing sticking of any of the layers to the heated press parts or rolls.

The above description has been general, insofar as are concerned the particular materials and the particular shapes and forms of the various components to be bonded. Below in Table I are examples selected from the several hundred combinations of malleable metals that have been bonded according to the present process. Included in the table is information regarding dimensions, times, temperatures and pressures which were employed in applying the process to the various combinations listed.

The formulations of most of the materials indicated in the above Table I will be apparent from their names.

*Table I*

| Pairs of Materials Bonded and Starting Thicknesses (Inches) | Hot-Pressing Step | | | Reduction Step, Range (Percent) | Final Heating Step | |
|---|---|---|---|---|---|---|
| | Force (Tons) | Temp. (° F.) | Time (Min.) | | Temp. (° F.) | Time (Min.) |
| 10 K. Yellow Gold .030 (1) / Inconel .750 | 40 | 1,650 | 20 | 15-20 | 1,300 | 30 |
| 12 K. Yellow Gold .011 (2) / 18% Nickel Silver 1.500 | 30 | 1,600 | 20 | 10-15 | 1,300 | 25 |
| 10 K. Yellow Gold .046 (3) / 18% Nickel Silver .375 | 30 | 1,400 | 26 | 20-25 | 1,300 | 15 |
| 10 K. Yellow Gold .006 (4) / Low Carbon Nickel 1.500 | 30 | 1,560 | 25 | 10-15 | 1,300 | 30 |
| 12 K. Yellow Gold .017 (5) / Brass (P-20) 1.000 | 10 | 1,550 | 20 | 10-15 | 1,300 | 20 |
| 12 K. White Gold .005 (6) / Brass (Scovill #20) 1.500 | 10 | 1,550 | 20 | 10-15 | 1,300 | 12 |
| 14 K. White Gold .019 (7) / 14 K. Red Gold .075 (8) | 10 | 1,560 | 20 | 25-30 | 1,300 | 10 |
| 8 K. Gold Solder .033 (9) / Nickel .250 | 20 | 1,400 | 14 | 30-35 | 1,200 | 25 |
| 9½ K. Gold Solder .075 (10) / 9½ K. Yellow Gold .375 (11) | 30 | 1,400 | 20 | 30-35 | 1,200 | 25 |
| Fine Silver .102 / Nickel .150 | 20 | 1,500 | 20 | 25-30 | 1,300 | 12 |
| Coin Silver .270 / Nickel .375 | 20 | 1,500 | 20 | 25-30 | 1,300 | 30 |
| Sterling Silver .750 / Silver Solder .078 (12) | 30 | 1,400 | 11 | 30-35 | 1,100 | 30 |
| Silver Solder .090 (13) / Fine Silver .500 | 10 | 1,400 | 10 | 25-30 | 1,100 | 30 |
| Silver Cadmium .250 (14) / Fine Silver .025 | 30 | 1,500 | 20 | 25-30 | 1,200 | 20 |
| Platinum .010 / Inconel 1.000 | 40 | 1,650 | 20 | 15-20 | 1,375 | 30 |
| Platinum Iridium 80/20 .030 / Nickel .112 | 30 | 1,650 | 15 | 20-25 | 1,375 | 10 |
| Platinum Ruthenium 89/11 .072 / 90/10 Silver Gold .0165 | 20 | 1,650 | 15 | 20-25 | 1,375 | 10 |
| Copper .375 / Nickel .148 | 40 | 1,750 | 40 | 20-25 | 1,300 | 25 |
| Brass (Scovill #20) 1.000 / Silver Solder .050 (15) | 40 | 1,450 | 13 | 25-30 | 1,100 | 30 |
| 60/40 Brass .041 / Invar .125 | 30 | 1,650 | 15 | 20-25 | 1,600 | 30 |
| Nickel .250 / Platinum .010 | 10 | 1,650 | 20 | 20-25 | 1,375 | 15 |
| AISI 1010 Steel .120 / A-Phos.Bronze .030 | 30 | 1,650 | 20 | 25-30 | 1,350 | 20 |
| Titanium ¹.015 / Copper .005 | 20 | 1,600 | 20 | 25-30 | 1,200 | 30 |
| Molybdenum ¹ .118 / Copper .250 | 30 | 1,650 | 20 | | | |
| Monel .030 / Fine Silver .300 | 20 | 1,550 | 15 | 15-20 | 1,300 | 30 |
| Monel .250 / 10 K. Yellow Gold .083 | 12 | 1,650 | 15 | 15-20 | 1,300 | 30 |
| Inconel .750 / Monel .010 | 40 | 1,650 | 20 | 15-20 | 1,300 | 30 |
| 2% Beryllium Copper .094 / Copper .125 | 20 | 1,600 | 25 | 30-35 | 1,375 | 20 |
| 2% Beryllium Copper .375 / Fine Silver .065 | 20 | 1,550 | 14 | 15-20 | 1,375 | 20 |
| 304 Stainless Steel .230 / 90/10 Gold Platinum .051 | 30 | 1,750 | 15 | 15-20 | 1,700 | 45 |
| 430 Stainless Steel .562 / Copper .090 | 30 | 1,750 | 46 | 15-20 | 1,500 | 30 |
| Vanadium ¹ .005 / Titanium .020 | 30 | 1,600 | 35 | 25-30 | 1,200 | 30 |
| Vanadium ¹ .005 / AISI 1010 Steel .200 | 30 | 1,600 | 35 | 25-30 | 1,200 | 30 |
| A-Phos. Bronze .090 / 430 SS .562 | 30 | 1,750 | 45 | 15-20 | 1,500 | 30 |

Table I—Continued

| Pairs of Materials Bonded and Starting Thicknesses (Inches) | Hot-Pressing Step | | | Reduction Step, Range (Percent) | Final Heating Step | |
|---|---|---|---|---|---|---|
| | Force (Tons) | Temp. (° F.) | Time (Min.) | | Temp. (° F.) | Time (Min.) |
| 10% Nickel Silver .400<br>5 K. Yellow Gold Solder .031 (16) | 30 | 1,430 | 17 | 20–25 | 1,200 | 30 |
| 18% Nickel Silver .375<br>Silver Solder .025 (17) | 20 | 1,400 | 12 | 25–30 | 1,100 | 30 |
| Rodar .075<br>Fine Silver .025 | 30 | 1,650 | 20 | 25–30 | 1,300 | 30 |
| Mn-Alloy .250 (18)<br>Invar .187 | 30 | 1,650 | 15 | 15–20 | 1,600 | 30 |
| Pd-Alloy .072 (19)<br>Silver Solder .016 (20) | 20 | 1,400 | 10 | 20–25 | 1,100 | 15 |
| Fine Silver [2] .125<br>Sil-Fos Solder .025 (21) | 10 | 1,350 | 6 | 10 | 1,000 | 15 |

[1] Package method.
[2] Hot rolled at 1000° F. for step #2.

In Table II below, the constituents of certain of the entries in Table I are given for reference. The parenthesized numerals in Table II correspond to those so numbered in Table I. The values given in Table II for the various constituents are percentages by weight.

Table II

| | Au | Cu | Ag | Zn | Ni | In | Cd | Mn | Pd | Ru | P |
|---|---|---|---|---|---|---|---|---|---|---|---|
| (1) 10 K. Yellow Gold | 41.67 | 38.50 | 5.83 | 12.83 | 1.17 | | | | | | |
| (2) 12 K. Yellow Gold | 50.00 | 31.71 | 7.93 | 7.79 | 2.57 | | | | | | |
| (3) 10 K. Yellow Gold | 41.67 | 31.08 | 17.45 | 8.80 | | | 1.00 | | | | |
| (4) 10 K. Yellow Gold | 41.67 | 40.15 | 7.00 | 9.68 | 1.50 | | | | | | |
| (5) 12 K. Yellow Gold | 50.00 | 31.71 | 7.93 | 7.79 | 2.57 | | | | | | |
| (6) 12 K. White Gold | 50.00 | 34.00 | | 5.75 | 10.25 | | | | | | |
| (7) 14 K. White Gold | 58.33 | 23.10 | | 5.00 | 13.57 | | | | | | |
| (8) 14 K. Red Gold | 58.33 | 40.67 | | 1.00 | | | | | | | |
| (9) 8 K. Gold Solder | 33.33 | 17.00 | 40.00 | 7.00 | | | | 2.67 | | | |
| (10) 9½ K. Gold Solder | 39.58 | 15.41 | 36.25 | 6.34 | | | | 2.42 | | | |
| (11) 9½ K. Yellow Gold | 39.58 | 43.46 | 7.95 | 9.01 | | | | | | | |
| (12) Silver Solder | | 16.00 | 52.00 | 15.50 | | | | 16.50 | | | |
| (13) Silver Solder | | 28.25 | 66.70 | 5.05 | | | | | | | |
| (14) Silver Cadmium | | | 90.00 | | | | 10.00 | | | | |
| (15) Silver Solder | | 28.25 | 66.70 | 5.05 | | | | | | | |
| (16) 5 K. Yellow Gold Solder | 20.83 | 29.69 | 44.53 | 4.95 | | | | | | | |
| (17) Silver Solder | | 21.90 | 66.80 | 11.30 | | | | | | | |
| (18) Alloy | | 18.00 | | | 10.00 | | | | 72.00 | | |
| (19) Alloy | | | | | | | | | 96.00 | 4.00 | |
| (20) Silver Solder | | 22.50 | 60.50 | 7.00 | | | | 10.00 | | | |
| (21) Sil-Fos Solder | | 73.60 | 20.00 | | | | | | | | 6.40 |

In the above description, a rolling operation as illustrated in Fig 3 is mentioned as the method of squeezing for reduction purposes. It will be understood that other squeezing methods may be employed for handling components of shapes other than flat. For example, if it is desired to produce clad rods, a rod or wire of one material may be inserted into a tube of another material and squeezed by radially positioned jaws in the hot-pressing step and thereafter drawn through suitable drawing dies in the reduction step. Butt welding can be carried out by gripping the components in presses with movable jaws to perform the forcing operations in both the hot-pressing and the reduction steps. Further details are not given with regard to these alternatives, since pressing and squeezing apparatus for the various purposes is known.

Recapitulating, the invention is characterized by:

(1) A first partial bonding brought about by application of a comparatively low force between conventionally clean contact surfaces at least one of which has been work hardened, with heating sufficient to cause rapid bond growth, caused it is believed by rapid diffusion during or near recrystallization at a multitude of contacts. This may not substantially, if at all, enlarge the interface.

(2) A second partial bonding brought about by a squeezing operation accompanied by sufficient pressure to exceed the elastic limits of the materials, thus re-energizing the partially bonded interface. In this step, pressure and resulting deformation will create a multitude of contact points at which (it is believed) atoms of the metals are forced close enough together so as to be in the range of interatomic attraction. This also enlarges the bonding interface.

(3) Heating to increase the previously produced partial bonds by lateral growth and by diffusion during or near recrystallization.

The heating during the first partial bonding step of Fig. 1 is at a temperature in the range extending from and including the recrystallization temperature of at least one of the metals which has been work hardened. If only one of the metals has been work hardened, then this heating is in a range extending from and including the recrystallization temperature of that metal. If there be more than one metal work hardened, then this temperature is in the range from and including the recrystallization temperature of the metal which has the highest recrystallization temperature, because it is by such means that not only is rapid diffusion attained upon energy release at both interfacial surfaces, but assurance is had that both metals will be in an unworked state ready for subsequent working in the next reduction step of Fig. 3. In either event, the upper end of this temperature range excludes the formation of a liquid phase, or brittle intermetallic compounds.

When the reduction step is reached, squeezing of the partially bonded metals is effected at a temperature required to be below the recrystallization temperature of that one of the metals having the highest recrystallization temperature, although it may be below both. This assures again cold working and re-energization of at least one (and sometimes both) of the metals at the interface, so that upon final heating in the last step it will be certain that energy may be available for release for recrystallization and diffusion, which accompany transverse bond growth, resulting in further increase in bond strength.

As to the final heating, i. e., third step, it is sufficient that this shall occur at a temperature which will recrystallize at least one of the metals, but below one of those temperatures, whichever is the lower and at which liquid phase or a brittle intermetallic compound will form. In this connection, several situations arise in practice, depending upon how the consumer wants to receive the finished metal, i. e., with both metals soft, or one soft and the other hard.

For example, assume two metals A and B, the former having a high and the latter a low temperature of recrystallization. Assume also that in the process the temperature of the second or reduction step is just below said high temperature of recrystallization but above said low temperature of recrystallization. Thus in said second or reduction step the one metal A will work harden but the metal B will not. Therefore, in the final heat treatment of the third or final step it becomes necessary to recrystallize at a temperature above the high recrystallization temperature of metal A, since metal B will not have been work hardened in the second step, and therefore will not undergo recrystallization in the final heat treatment.

Next assume that the temperature of the second or reduction step is below the low recrystallization temperature of metal B. In this case both metals A and B will have been work hardened because each has been worked at a temperature below its temperature of recrystallization. Thus under these circumstances the temperature of the final heat treatment may be at or above the temperature of recrystallization of metal B, because metal B will recrystallize even though the particular temperature may be such that metal A, having the high temperature of recrystallization, does not recrystallize.

Factual matters herein stated, both with regard to the steps employed and the results obtained, are definite and realizable, regardless of theory. The theoretical explanations of the various results flowing from the various steps of the process are those that appear to be most reasonable, but we do not intend to be bound thereby because other theoretical explanations may be conceived.

In view of the above, it will be seen that the several objects of the invention are achieved and other advantageous results attained.

Since many changes could be made in the above methods without departing from the scope of the invention, it is intended that all matter contained in the above description or shown in the accompanying drawings shall be interpreted as illustrative and not in a limiting sense.

We claim:

1. The method of solid-phase bonding malleable metal pieces which have been cleaned throughout their surfaces which are to be bonded, which have at least one of said surfaces work hardened and which have said surfaces placed in contact; comprising, first, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the one of the metals which has been work hardened, or if there be more than one work-hardened metal then from and including the recrystallization temperature of the one which has the highest recrystallization temperature, and in either case up to but not including the temperature at which a liquid-phase or brittle intermetallic compound would appear in the bonding area, in order to create a first partial bond between the metals throughout said area, second, squeezing the partially bonded metals at a temperature below the recrystallization temperature of that one of the metals having the highest recrystallization temperature, said squeezing being carried out with a substantial reduction of the combined thicknesses of the metals with a concomitant substantial increase in the bonding area, in order to re-energize the interface; and, third, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

2. The method of solid-phase bonding malleable metal pieces according to claim 1, wherein the time period of the heating specified in said first step is restricted to a time during which the partial bond strength rapidly increases.

3. The method of solid-phase bonding malleable metal pieces according to claim 1, wherein the metals are cooled between said first and second steps.

4. The method of solid-phase bonding malleable metal pieces according to claim 3, wherein pressure is applied across the contact surfaces of the metals while they are cooling between said first and second steps.

5. The method of solid-phase bonding malleable metal pieces which have been cleaned throughout their surfaces which are to be bonded, which have both of said surfaces work hardened and which have said surfaces placed in contact; comprising, first, placing together said surfaces to be bonded, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the metal having the highest recrystallization temperature up to but not including the temperature at which a liquid-phase or brittle intermetallic compound would appear in the bonding area, in order to create a first partial bond between the metals throughout said area; second, squeezing the partially bonded metals at a temperature below the recrystallization temperature of that one of the metals having the highest recrystallization temperature so as to work harden at least one of said metals, said squeezing being carried out with a substantial reduction of the combined thicknesses of the metals with a concomitant substantial increase in the bonding area in order to re-energize the interface; and, third, thereafter heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

6. The method of solid-phase bonding malleable metal pieces according to claim 5, wherein the metals are cooled between said first and second steps.

7. The method of solid-phase bonding malleable metal pieces according to claim 6, wherein pressure is applied across the contact surfaces of the metals while they are cooling between said first and second steps.

8. The method of solid-phase bonding malleable metal sheets which have been cleaned throughout their surfaces which are to be bonded, which have at least one of said surfaces work hardened, and which have said surfaces placed in contact; comprising, first, simultaneously heating and pressing together the sheets, the pressure during said pressing and heating being sufficient to effect substantially throughout the bonding area a multitude of discrete contacts, said heating being at a temperature lying within the range which extends from and includes the recrystallization temperature of the one of the sheets which has been work hardened, or if there be more than one work-hardened sheet then from and including the recrystallization temperature of the one which has the highest recrystallization temperature, and in either case up to but not including the temperature at which a liquid-phase or brittle intermetallic compound would appear in the bonding area, in order to create a first partial bond between the sheets throughout said area; second, rolling the partially bonded sheets between rolls at a temperature below the recrystallization temperature of that one of the sheets having the highest recrystallization temperature, said rolling being carried out with a substantial reduction of the combined thicknesses of the sheets with a concomitant substantial increase in the bonding area, in order to increase said partial bond; and, third, heating the sheets at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

9. The method of solid-phase bonding malleable metal sheets according to claim 8, wherein the sheets are connected by welding during their passage between the rolls in order to minimize alligatoring and stretch-off.

10. The method of solid-phase bonding malleable metal sheets according to claim 8, wherein said sheets are fastened as by welding or riveting at their margins which lead and trail relative to passage of the sheets through the rolls, in order to prevent alligatoring and stretch-off.

11. The method of solid-phase bonding malleable metal pieces which have been cleaned throughout their surfaces which are to be bonded, which have at least one of said surfaces work hardened and which have said surfaces placed in contact; comprising, first, simultaneously heating and pressing together the metals, the pressure during said pressing and heating being sufficient to effect substantially throughout the bonding area a multitude of discrete contacts, said heating being at a temperature lying within the range of substantially 400° F. to 1,850° F. and which extends from and includes the recrystallization temperature of the one of the metals which has been work hardened, or if there be more than one work-hardened metal then from and including the recrystallization temperature of the one which has the highest recrystallization temperature, and in either case up to but not including the temperature at which a liquid-phase or brittle intermetallic compound would appear in the bonding area, in order to create a first partial bond between the metals throughout said area; second, squeezing the partially bonded metals at a temperature below the recrystallization temperature of that one of the metals having the highest recrystallization temperature, said squeezing being carried out with a reduction in the range of substantially 10–35% of the combined thicknesses of the metals with a concomitant substantial increase in the bonding area, in order to increase said partial bond; and, third, heating the metals at a temperature lying within the range of substantially 1,000° F. to 1,700° F. and which will recrystallize at least one of the metals, but below one of those temperatures, whichever is the lower, as the case may be, at which liquid-phase material or a brittle intermetallic compound would form in appreciable amount, said heating being continued for a period of time within the range of substantially 2 to 45 minutes so as to effect growth of the partial bond, thereby substantially to increase the over-all bond strength.

12. The method of solid-phase bonding malleable metal pieces which have been cleaned throughout their surfaces which are to be bonded, which have both of said surfaces work hardened and which have said surfaces placed in contact; comprising, first, placing together said surfaces to be bonded, simultaneously heating and pressing together the metals, the pressure during said pressing and heating being sufficient to effect substantially throughout the bonding area a multitude of discrete contacts, said heating being at a temperature lying within the range of substantially 400° F. to 1,850° F. and which extends from and includes the recrystallization temperature of the metal having the highest recrystallization temperature up to but not including the temperature at which a liquid-phase or brittle intermetallic compound would appear in the bonding area, in order to create a first partial bond between the metals throughout said area; second, squeezing the partially bonded metals at a temperature below the recrystallization temperature of that one of the metals having the highest recrystallization temperature, said squeezing being carried out with a reduction in the range of substantially 10–35% of the combined thicknesses of the metals with a concomitant substantial increase in the bonding area in order to increase said partial bond; and, third, thereafter heating the metals at a temperature lying within the range of substantially 1,000° F. to 1,700° F. and which will recrystallize at least one of the metals, but below one of those temperatures, whichever is the lower, as the case may be, at which liquid-phase material or a brittle intermetallic compound would form in appreciable amount, said heating being continued for a period of time within the range of substantially 2 to 45 minutes so as to increase the over-all bond strength.

13. The method of solid-phase bonding malleable metal pieces which have been cleaned throughout their surfaces which are to be bonded, which have at least one of said surfaces work hardened and which have said surfaces placed in contact; comprising, first, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the one of the metals which has been work hardened, or if there be more than one work-hardened metal then from and including the recrystallization temperature of the one which has the highest recrystallization temperature, and in either case up to but not including the temperature at which a liquid-phase or brittle intermetallic compound would appear in the bonding area, in order to create a first partial bond between the metals throughout said area; second, cooling the partially bonded metals substantially to room temperature, squeezing the partially bonded metals at a temperature below the recrystallization temperature of that one of the metals having the highest recrystallization temperature, said squeezing being carried out with a reduction in the range of substantially 10–35% of the combined thicknesses of the metals with a concomitant substantial increase in the bonding area, in order to increase said partial bond; and, third, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

14. The method of solid-phase bonding malleable metal pieces which have been cleaned throughout their surfaces which are to be bonded, which have at least one of said surfaces work hardened and which have said surfaces placed in contact; comprising, first, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the one of the metals which has been work hardened, or if there be more than one work-hardened metal, then from and including the recrystallization temperature of the one which has the highest recrystallization temperature, and in either case up to but not including the temperature at which a liquid phase or brittle intermetallic compound would appear in the bonding area, said heating being carried out for a period sufficient only to create a first partial diffusion bond between the metals throughout said area; second, squeezing the partially bonded metals at a temperature below the recrystallization temperature of that one of the metals having the highest recrystallization temperature, said squeezing being carried out with a substantial reduction of the combined thicknesses of the metals with a concomitant substantial increase in the bonding area; and, third, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

15. The method of solid-phase bonding malleable metal pieces which have been cleaned throughout their surfaces which are to be bonded, which have at least one of said surfaces energized by having been work hardened and which have said surfaces placed in contact while relatively cool; comprising, first, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the one of the metals which has been work hardened, or if there be more than one work-hardened metal, then from and including the recrystallization temperature of the one which has the highest recrystallization temperature, and in either case up to but not including the temperature at which a liquid phase or brittle intermetallic compound would appear in the bonding area, said heating being carried out for a period to decrease said energization but sufficient only to create a first partial diffusion bond between the metals throughout said area; second, squeezing the partially bonded metals at a temperature below the recrystallization temperature of that one of the metals having the highest recrystallization temperature, said squeezing being carried out with a substantial reduction of the combined thicknesses of the metals with a concomitant substantial increase in the bonding area in order to effect re-energization at the interface by work hardening at least one metal interface; and, third, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

16. The method of solid-phase bonding malleable metal pieces which have been cleaned throughout their surfaces which are to be bonded, which have at least one of said surfaces energized by having been work hardened and which have said surfaces placed in interfacial contact while relatively cool; comprising, first, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the one of the metals which has been work hardened, or if there be more than one work-hardened metal, then from and including the recrystallization temperature of the one which has the highest recrystallization temperature, and in either case up to but not including the temperature at which a liquid phase or brittle intermetallic compound would appear in the bonding area, said heating being carried out for a period to decrease said energization but sufficient only to create by relatively rapid diffusion across the interface a first partial diffusion bond between the metals throughout said area; second, squeezing the partially bonded metals at a temperature below the recrystallization temperature of that one of the metals having the highest recrystallization temperature, said squeezing being carried out with a substantial reduction of the combined thicknesses of the metals with a concomitant substantial increase in the bonding area in order to effect re-energization at the interface by work hardening at least one metal interface; and, third, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

17. The method of solid-phase bonding malleable metal pieces which have been cleaned throughout their surfaces which are to be bonded, which have at least one of said surfaces energized by having been work hardened and which have said surfaces placed in interfacial contact; comprising, first, simultaneously heating and pressing together the metals, the pressure during said pressing and heating being sufficient to effect substantially throughout the bonding area a multitude of discrete contacts, said heating being at a temperature lying within the range which extends from and includes the recrystallization temperature of the one of the metals which has been work hardened, or if there be more than one work-hardened metal, then from and including the recrystallization temperature of the one which has the highest recrystallization temperature, and in either case up to but not including the temperature at which a liquid phase or brittle intermetallic compound would appear in the bonding area, said heating being carried out for a period to decrease said energization but sufficient only to create by relatively rapid diffusion across the interface a first partial diffusion bond between the metals throughout said area; second, cooling the partially bonded metals sufficiently that at least one component will work harden in the next step; third, squeezing the partially bonded metals at a temperature below the recrystallization temperature of that one of the metals having the highest recrystallization temperature, said squeezing being carried out with a substantial reduction of the combined thicknesses of the metals with a concomitant substantial increase in the bonding area in order to effect re-energization at the interface by work hardening at least one metal interface; and, fourth, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

18. The method of solid-phase bonding malleable metal pieces which have been cleaned throughout their surfaces which are to be bonded, which have at least one of said surfaces energized by having been work hardened and which have said surfaces placed in interfacial contact while relatively cool; comprising, first, simultaneously heating and pressing together the metals, the pressure during said pressing and heating being sufficient to effect substantially throughout the bonding area a multitude of discrete contacts but without any substantial reduction in thickness, said heating being at a temperature lying within the range which extends from and includes the recrystallization temperature of the one of the metals which has been work hardened, or if there be more than one work-hardened metal, then from and including the recrystallization temperature of the one which has the highest recrystallization temperature, and in either case up to but not including the temperature at which a liquid phase or brittle intermetallic compound would appear in the bonding area, said heating being carried out for a period to decrease said energization but sufficient only to create by relatively rapid diffusion across the interface a first partial diffusion bond between the metals throughout said area; second, cooling the partially bonded metals sufficiently that at least one component will work harden in the next step; third, squeezing the partially bonded metals at a temperature below the recrystallization temperature of that one of the metals having the highest recrystallization temperature, said squeezing being carried out with a substantial reduction of the combined thicknesses of the metals with a concomitant substantial increase in the bonding area in order to effect re-energization at the interface by work hardening at least one metal interface; and, fourth, heating the metals at a temperature which will recrystallize at least one of the metals, but below one of those temperatures, whichever is the lower, as the case may be, at which liquid-phase material or a brittle intermetallic compound would form in appreciable amount, said heating being continued for such a time as to effect growth of the partial bond, thereby substantially to increase the over-all bond strength.

References Cited in the file of this patent
UNITED STATES PATENTS

| | | |
|---|---|---|
| 2,707,323 | Watson | May 3, 1955 |
| 2,753,623 | Boessenkool et al. | July 10, 1956 |
| 2,782,497 | Campbell | Feb. 26, 1957 |
| 2,786,265 | Keay | Mar. 26, 1957 |